United States Patent
Yonezawa et al.

(10) Patent No.: US 9,980,085 B2
(45) Date of Patent: May 22, 2018

(54) APPARATUS AND METHOD FOR ESTIMATING POSITION OF WIRELESS COMMUNICATION DEVICE, AND WIRELESS COMMUNICATION SYSTEM

(71) Applicant: KABUSHIKI KAISHA TOSHIBA, Tokyo (JP)

(72) Inventors: Yuki Yonezawa, Kanagawa (JP); Cam Ly Nguyen, Kanagawa (JP); Takafumi Sakamoto, Tokyo (JP); Yusuke Doi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/444,960

(22) Filed: Feb. 28, 2017

(65) Prior Publication Data
US 2017/0374499 A1    Dec. 28, 2017

(30) Foreign Application Priority Data
Jun. 24, 2016  (JP) ................... 2016-125700

(51) Int. Cl.
*H04W 4/02* (2018.01)
*H04B 17/318* (2015.01)

(52) U.S. Cl.
CPC ............ *H04W 4/02* (2013.01); *H04B 17/318* (2015.01)

(58) Field of Classification Search
CPC .... H04W 4/021; H04W 4/028; H04B 17/318; H04B 17/327; H04B 1/7083
See application file for complete search history.

(56) References Cited

U.S. PATENT DOCUMENTS

| | | | |
|---|---|---|---|
| 2012/0265482 A1 | 10/2012 | Grokop et al. | |
| 2014/0056165 A1* | 2/2014 | Siomina | H04B 1/7083 370/252 |
| 2017/0041740 A1 | 2/2017 | Kanayama et al. | |

FOREIGN PATENT DOCUMENTS

| | | |
|---|---|---|
| JP | 2008-178006 | 7/2008 |
| JP | 2014-513291 | 5/2014 |
| JP | 2017-032469 | 2/2017 |

* cited by examiner

*Primary Examiner* — Diane Mizrahi
(74) *Attorney, Agent, or Firm* — Nixon & Vanderhye, P.C.

(57) ABSTRACT

According to one embodiment, a memory stores a first information including a positional relationship among a plurality of positional candidates, a second information including an influence on the plurality of positional candidates due to at least any of an attenuation and a reflection of a radio wave by an object located at a periphery of the plurality of positional candidates, and a third information including a first received signal strength indicator of the radio wave transmitted from a first wireless communication device and received by a second wireless communication device. A processor estimates a position of the second wireless communication device from the plurality of positional candidates, based on a first value as the first received signal strength indicator corrected with a first correction value based on the second information, and a plurality of first distances between the first wireless communication device and each of the plurality of positional candidates.

18 Claims, 8 Drawing Sheets

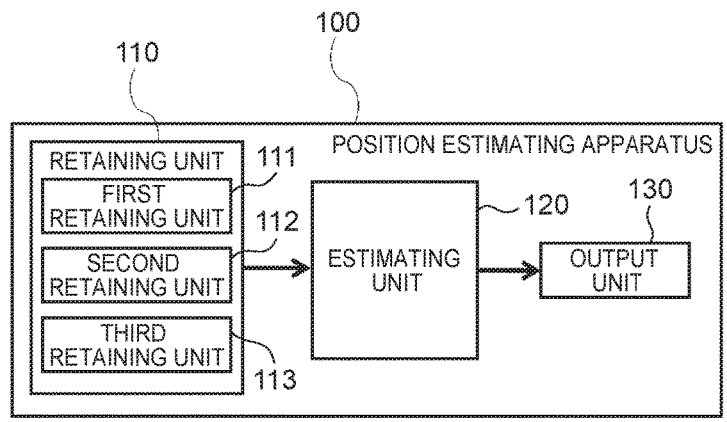
FIG. 1
| POSITIONAL CANDIDATE | $P_1$ | $P_2$ | $P_3$ | $P_4$ | ... | $P_N$ |
|---|---|---|---|---|---|---|
| COORDINATE | (0,0) | (100, 200) | (500, 200) | (900, 200) | ... | (x,y) |
FIG. 2
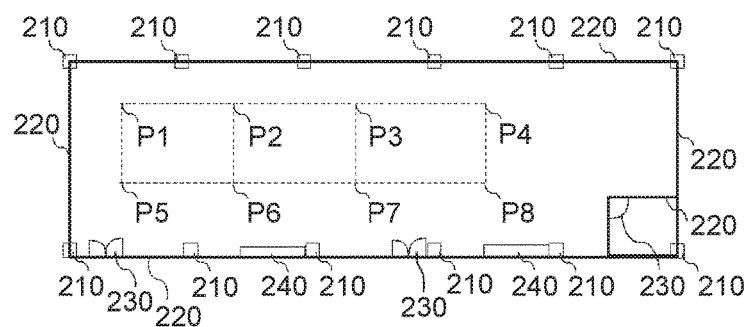
FIG. 3

|  | $N_1$ | $N_2$ | $N_3$ | ... | $N_N$ |
|---|---|---|---|---|---|
| $N_1$ |  | $R_{12}$ | $R_{13}$ | ... | $R_{1N}$ |
| $N_2$ | $R_{21}$ |  | $R_{12}$ | | $R_{2N}$ |
| $N_3$ | $R_{31}$ | $R_{32}$ |  | ... | $R_{3N}$ |
| ... | ... | ... | ... | | ... |
| $N_N$ | $R_{N1}$ | $R_{N2}$ | $R_{N3}$ | ... | |

FIG. 4

|  | $P_1$ | $P_2$ | $P_3$ | ... | $P_{N-1}$ |
|---|---|---|---|---|---|
| $P_1$ | | | | | |
| $P_2$ | $C_{21}$ | | | | |
| $P_3$ | $C_{31}$ | $C_{32}$ | | | |
| ... | ... | ... | ... | | |
| $P_N$ | $C_{N1}$ | $C_{N2}$ | $C_{N3}$ | ... | $C_{NN-1}$ |

FIG. 5

| POSITIONAL CANDIDATE | $P_1$ | $P_2$ | $P_3$ | $P_4$ | ... | $P_N$ | CONTRA-DICTION |
|---|---|---|---|---|---|---|---|
| WIRELESS COMMUNICATION DEVICE ID | $N_5$ | $N_2$ | $N_1$ | $N_3$ | ... | $N_x$ | Y |

FIG. 6

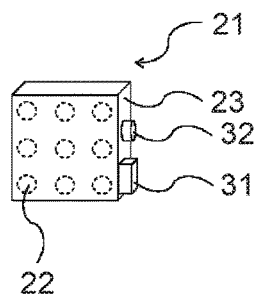 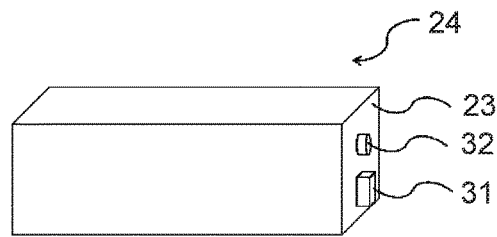
FIG. 15A  FIG. 15B
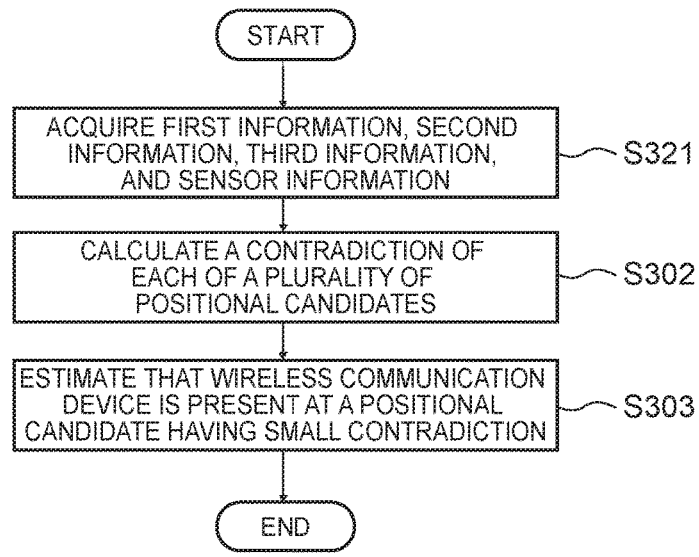
FIG. 16

APPARATUS AND METHOD FOR ESTIMATING POSITION OF WIRELESS COMMUNICATION DEVICE, AND WIRELESS COMMUNICATION SYSTEM

CROSS-REFERENCE TO RELATED APPLICATION

This application is based upon and claims the benefit of priority from Japanese Patent Application No. 2016-125700, filed on Jun. 24, 2016; the entire contents of which are incorporated herein by reference.

FIELD

Embodiments of the present invention relate to an apparatus and a method for estimating a position of a wireless communication device, and a wireless communication system.

BACKGROUND

As a method for estimating a position of a wireless communication device, for example, a method for calculating a presence probability of a radio node at each coordinate position, based on a statistical relationship between a static of a receiver that has been previously determined and a measurement value, has been known. Furthermore, a method for estimating a position of a movable portable device by using data of a motion sensor and data of an optical sensor has been known. Improving an accuracy of the estimation is desired.

BRIEF DESCRIPTION OF DRAWINGS

FIG. 1 is a block diagram of an exemplary configuration of an apparatus of estimating a position of a wireless communication device, according to a first embodiment.

FIG. 2 is a table of exemplary first information.

FIG. 3 is a plan view of the positional relationship between an object and a plurality of positional candidates.

FIG. 4 is a table of exemplary third information.

FIG. 5 is a table of an exemplary correction value.

FIG. 6 is a table of exemplary output information.

FIG. 15A is a view of an illuminating device having the wireless communication device and a sensor, and FIG. 15B is a view of an air conditioner having the wireless communication device and a sensor.

FIG. 16 is a flow chart of a method of estimating the position of the wireless communication device, according to the third embodiment.

DETAILED DESCRIPTION

Figure 7:
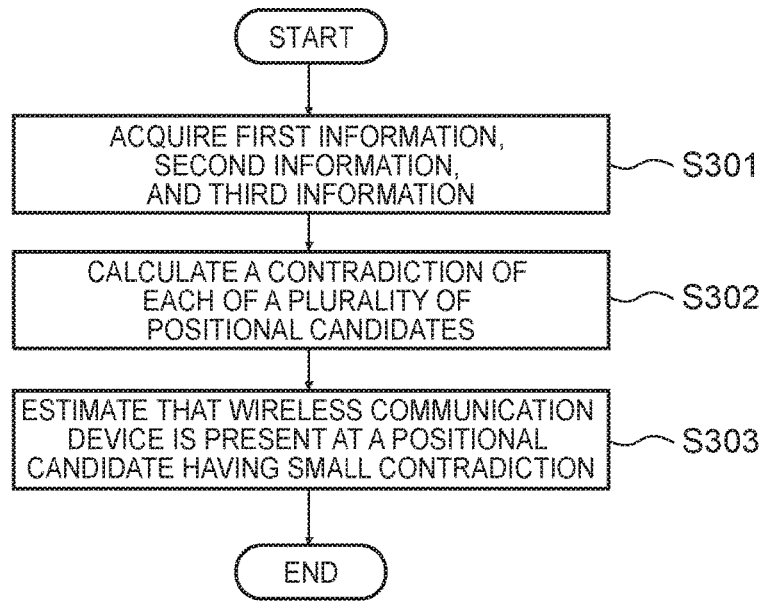
FIG. 7 is a flow chart of a method of estimating a position of a wireless communication device, according to the first embodiment.

According to one embodiment, an apparatus for estimating a position of a wireless communication device is provided. The apparatus includes a memory and a processor. The memory stores a first information related to a positional relationship among a plurality of positional candidates, a second information related to an influence on the plurality of positional candidates due to at least any of an attenuation and a reflection of a radio wave by an object located at a periphery of the plurality of positional candidates, and a third information including a first received signal strength indicator of the radio wave that is transmitted from a first wireless communication device and that is received by a second wireless communication device. The processor estimates a position of the second wireless communication device from the plurality of positional candidates, based on a first value as the first received signal strength indicator corrected with a first correction value based on the second information, and a plurality of first distances between the first wireless communication device and each of the plurality of positional candidates.

Embodiments of the present invention will be described below with reference to the drawings. Note that, the drawings are schematic or conceptual, and thus are not necessarily the same as realities. Elements which are the same as those previously described in the respective drawings are denoted with the same reference signs, and the descriptions thereof will be appropriately omitted.

First Embodiment

When a wireless communication device is provided at any of a plurality of positional candidates and a position of the wireless communication device is unknown, an apparatus for estimating a position of a wireless communication device (Hereinafter, this apparatus is called "a position estimating apparatus") according to the present embodiment, estimates the position of the wireless communication device. A plurality of wireless communication devices may be individually provided at the plurality of positional candidates.

The plurality of the wireless communication devices may be individually provided to a plurality of devices. Examples of the devices include an illuminating device and an air conditioner. The plurality of positional candidates is provided, for example, in an indoor certain range or an outdoor certain range. For example, the plurality of positional candidates corresponds to a plurality of predetermined positions determined before the plurality of the wireless communication devices is provided. The plurality of positional candidates is determined, for example, based on a design drawing.

For example, the wireless communication devices each are fixed at a predetermined position.

For example, after the position or the arrangement for the devices each having the radio apparatus, is designed and then is executed, the position estimating apparatus according to the present embodiment can estimate the position of each of the devices having the wireless communication device.

Based on information acquired by transmitting and receiving a radio wave between the plurality of the wireless communication devices, the position estimating apparatus can estimate the position of each of the wireless communication devices. Alternatively, the position estimating apparatus can estimate the position of each of the wireless communication devices, based on information of a radio wave received by the plurality of the wireless communication devices, the radio wave being transmitted from a radio transmitter provided at a predetermined position.

FIG. 1 is a block diagram of an exemplary configuration of the position estimating apparatus 100. The position estimating apparatus 100 includes a retaining unit 110 (memory) and an estimating unit 120 (processor). The estimating apparatus 100 may further include an output unit 130.

The retaining unit 110 retains a first information, a second information, and a third information. The first information relates to a positional relationship between the plurality of positional candidates at which the wireless communication devices are provided. The first information includes, for example, information related to the coordinates of the plurality of positional candidates. The first information may relate to a plurality of ranges indicating the plurality of positional candidates. The first information may be acquired, for example, from a drawing indicating the plurality of positional candidates. The first information includes, for example, a distance between all pairs of the plurality of positional candidates. The distance may be an absolute value or a relative value.

When the position of each of the wireless communication devices are estimated based on the information of the radio wave received by the plurality of the wireless communication devices, the radio wave being transmitted from the radio transmitter provided at the predetermined position, the first information may further include information related to the positional relationship between the plurality of positional candidates and the radio transmitter provided at the predetermined position.

FIG. 2 is a table of the exemplary first information. The first information may relate to, for example, N spots of the positional candidates $P_1$ to $P_N$ indicated with two-dimensional coordinates (x, y). The N is a positive integer larger than or equal to 2.

The second information relates to an influence on the plurality of positional candidates due to at least any of attenuation and reflection of the radio wave by an object located at a periphery of the plurality of positional candidates. The second information may include information related to a correction value to be described later. The second information includes, for example, at least one of the attenuation rate and the reflection rate of the radio wave due to the object located at the periphery of the positional candidates and additionally a positional relationship between the object and the plurality of positional candidates. The information related to the positional relationship between the object and the plurality of positional candidates relates to, for example, a distance between the object and each of the plurality of positional candidates. The second information may include at least one of a shape, a size, a material and a density of the object, instead of a conductivity of the object located at the periphery of the positional candidates.

Examples of the object include a construct such as a wall, a pillar, or a door, a structure such as a shelf, a person, and other objects that intercept a propagation of the radio wave. For example, when the plurality of positional candidates is provided in one or a plurality of rooms, the object located at the periphery of the plurality of positional candidates is present in the one or the plurality of rooms. For example, when the plurality of positional candidates is provided outdoors, examples of the object located at the periphery of the plurality of positional candidates include a construct or a structure that surrounds the plurality of positional candidates and an object present in a range surrounded by the construct and the structure. Examples of the object located at the periphery of the plurality of positional candidates include at least an object on a straight line with which positions of any two of the wireless communication devices that transmit and receive a radio wave are linked, and an object in proximity to the straight line.

For example, when the wireless communication devices each are provided to a device having a metal-made housing, the housing is also regarded as the object.

When the position of each of the wireless communication devices is estimated based on the information of the radio wave received by the plurality of the wireless communication devices, the radio wave being transmitted from the radio transmitter provided at the predetermined position, the second information may further include information related to the positional relationship between the plurality of positional candidates and the object.

FIG. 3 is a plan view of a positional relationship between the object and the plurality of positional candidates. FIG. 3 shows the positional relationship between eight spots of the positional candidates $P_1$ to $P_8$ present indoors, a wall 220 and a pillar 210 that surround the eight positional candidates, a door 230 provided to the wall 220, and a structure 240, such as a shelf, provided along the wall 220. The retaining unit 110 may has a drawing including the first information and the information related to the positional relationship between the object and the plurality of conditional candidates, included in the second information. The retaining unit 110 can acquire the first information and the information related to the positional relationship between the object and the plurality of conditional candidates, included in the second information, from the drawing.

The third information relates to a received signal strength indicator (RSSI) of the radio wave transmitted from one wireless communication device, which is received by other wireless communication devices. The one wireless communication device that transmits the radio wave may be positioned at any of the plurality of positional candidates, or may be positioned at a predetermined position except for the plurality of positional candidates. A position of the wireless communication device that transmits the radio wave may be previously determined.

The received signal strength indicator is, for example, a value based on measurement due to each of the wireless communication devices that receive the radio wave. For example, a plurality of the received signal strength indicators each may be a relative value in a signal strength received by the plurality of the wireless communication devices. When no radio wave is received, the received signal strength indicator is zero.

FIG. 4 is a table of the exemplary third information. The third information includes information related to a correspondence relationship among the wireless communication device $N_x$ that has transmitted the radio wave, the wireless communication device $N_y$ ($N_1$ to $N_N$, N is a positive integer), and the received signal strength indicator $R_{xy}$. N is a positive integer larger than or equal to 2, and x and y each are a positive integer of 1 to N. The third information includes, for example, a plurality of the received signal strength indicator $R_{xy}$ corresponding to all combinations of N units of the wireless communication devices. The number of the positional candidates and the number of the wireless communication devices may be equivalent to each other or may be different from each other.

The retaining unit 110 may include, for example, a first retaining unit 111, a second retaining unit 112, and a third retaining unit 113. For example, the first retaining unit 111 may retain the first information, the second retaining unit 112 may retain the second information, and the third retaining unit 113 may retain the third information.

The first information, the second information, and the third information may be acquired from another device. The position estimating apparatus 100 may include a storage, and may acquire the first information, the second information, and the third information from the storage.

The estimating unit 120 estimates the position of each of the wireless communication devices, based on the first information, the second information, and the third information. The estimating unit 120 estimates a position of each of the wireless communication devices from the plurality of positional candidates, based on values of the received signal strength indicators each corrected with the correction value based on at least any of the attenuation and the reflection of the radio wave due to the object, and a distance between the wireless communication device that transmits the radio wave and each of the wireless communication devices that receive the radio wave.

The received signal strength indicator depends on the distance between the wireless communication device that transmits the radio wave and each of the wireless communication devices that receive the radio wave.

When the influence on the radio wave due to the object located at the periphery of the wireless communication device that transmits the radio wave and each of the wireless communication devices that receive the radio wave, is disregarded, the relationship between the received signal strength indicator of the radio wave received by each of the wireless communication devices, and the distance between the two wireless communication devices, is expressed by the following Expression (1) to (3).

$$y = x \quad (1)$$

$$x = 10 \times \eta \times \log_{10} \frac{d_{oi}}{d_{Cons}} \quad (2)$$

$$y = R_{oi} - R_{cons} \quad (3)$$

That is, a logarithm of a ratio between the received signal strength indicator of a corresponding wireless communication device at point i and a reference received strength indicator, is proportional to a logarithm of a ratio between a distance between point o and point i and a reference distance.

The right side and the left side of Expression (1) are not necessarily equivalent to each other because multipath fading or shadowing occurs in the radio wave due to various factors. When each of the wireless communication devices that receive the radio wave is unknown, an absolute value of a difference between a predictive value x and a value y based on the measurement, is expressed as contradiction c(h), as shown in Expression (4), on an assumption h that each of the wireless communication devices that receive the radio wave is present at one of the plurality of positional candidates. Each of the wireless communication devices can be estimated to be at a positional candidate having a smaller contradiction c(h) than other positional candidates.

$$c(h)=|(y-x)|^m, \text{ under } h \quad (4)$$

In other words, the contradiction c(h) of the positional candidate at which each of the wireless communication devices that receive the radio wave is estimated to be positioned, is smaller than the contradiction of other positional candidates. A corresponding wireless communication device may be estimated to be at a positional candidate having the smallest contradiction, among the plurality of positional candidates. The contradiction may be calculated for all the plurality of positional candidates or the contradiction may be calculated for a part of the plurality of positional candidates. m represents a positive value larger than or equal to 1, and is arbitrarily determined. The assumption h indicates one included in the set H consisting of the plurality of positional candidates.

When the wireless communication device that transmits the radio wave is present at the predetermined position except for the plurality of positional candidates, a corresponding wireless communication device that receives the radio wave is estimated to be positioned at a positional candidate having a smaller contradiction than other positional candidates, among the plurality of positional candidates.

When the wireless communication device that transmits the radio wave is positioned at any of the plurality of positional candidates, the wireless communication device that transmits the radio wave can be estimated to be positioned on one side and a corresponding wireless communication device that receives the radio wave can be estimated to be positioned on the other side in one combination having a smaller contradiction than other combinations among combinations of any two positional candidates included in the plurality of positional candidates.

When the influence on the radio wave due to the object located at the periphery of the wireless communication device that transmits the radio wave and each of the wireless communication devices that receive the radio wave, is considered, Expression (5) instead of Expression (3) may be applied to Expression (4).

$$y=(r_{oi}+\hat{b}_{oi})-R_{cons}, \text{ under } h \quad (5)$$

Based on any one of the attenuation and the reflection of the radio wave due to the object, by correcting a received radio wave indicator, the accuracy of the estimation can be improved.

When the correction value is based on the attenuation rate, the correction value more increases as the quantity of the attenuation of the radio wave due to the object more increases. For example, the correction value depends on the attenuation rate of the radio wave due to the object corresponding to the thickness of the object or the conductivity of the object in a propagation direction of the radio wave. When the correction value is based on the reflection rate, the correction value more increases as the reflection rate of the radio wave due to the object more increases. For example, the correction value depends on the reflection rate of the radio wave due to the object corresponding to the thickness of the object and the conductivity of the object in the propagation direction of the radio wave. When the thickness of the object is ununiform in one direction, the average value, the maximum value, or the minimum value of a plurality of the thicknesses can be adopted. When the object includes a plurality of materials, the average value, the maximum value, or the minimum value of the plurality of materials in conductivity can be adopted. In addition, when the object has a plurality of numerical values so as to be indicated therewith, the average value, the maximum value, or the minimum value of the numerical values can be adopted. The correction value more increases as the distance between the wireless communication device that transmits the radio wave and the object more shortens. The correction value more increases as the distance between each of the wireless communication devices that receive the radio wave and the object more shortens.

FIG. 5 is a table of the exemplary correction value. For example, the correction value may be determined for each combination of any two positional candidates included in the N spots of the positional candidates. When the wireless communication device that transmits the radio wave is provided on one side and a corresponding wireless communication device that receives the radio wave is provided on the other side of one of the combinations of any two positional candidates, the correction value is used in order to correct the radio wave transmitted and received between the two wireless communication devices.

When other two of the wireless communication devices receive the radio wave transmitted from the one wireless communication device, if the influence on the radio wave due to the object located at the periphery of the three wireless communication devices is disregarded, Expression (6) and Expression (7) instead of Expression (2) and Expression (3) respectively, can be applied to Expression (4).

$$x = 10 \times \eta \times \log_{10} \frac{\hat{d}_{oi}}{\hat{d}_{oj}}, \text{ under } h \quad (6)$$

$$y = R_{oi} - R_{oj} \quad (7)$$

If the influence on the radio wave due to the object located at the periphery of the wireless communication device that transmits the radio wave and each of the wireless communication devices that receive the radio wave, is considered, Expression (8) instead of Expression (7) can be applied to Expression (4).

$$y = (r_{oi} + \hat{b}_{oi}) - (r_{oj} + \hat{b}_{oj}), \text{ under } h \quad (8)$$

Based on any of the attenuation and the reflection of the radio wave due to the object, by correcting the received radio wave indicator, the accuracy of the estimation can be improved.

The arrangement of the plurality of the wireless communication devices may be estimated by using Expression (9) instead of Expression (4).

$$c(h) = \Sigma W |(y-x)|^m, \text{ under } h \quad (9)$$

The contradiction c(h) may be the sum of all contradictions of combinations of any two wireless communication devices included in the plurality of the wireless communication devices.

The contradiction may be calculated for a plurality of the arrangements, or the contradiction may be calculated for a part of the plurality of the arrangements.

For example, the plurality of wireless communication devices can be estimated to be arranged in an arrangement having the contradiction c(h) in Expression (9) smaller than the contradiction c(h) of each of other arrangements, among the arrangements to be taken by the plurality of the wireless communication devices. For example, the plurality of the wireless communication devices may be estimated to be arranged in an arrangement having the smallest contradiction c(h) among the arrangements to be taken by the plurality of the wireless communication devices. Using Expression (2) and Expression (5) for x and y respectively, the arrangement of the plurality of the wireless communication devices can be estimated, with a reference wireless communication device. Using Expression (6) and Expression (8) for x and y respectively, the arrangement of the plurality of the wireless communication devices can be estimated due to transmission and reception of the radio wave between the plurality of the wireless communication devices. Based on any of the attenuation and the reflection of the radio wave due to the object, by correcting the received radio wave indicator even with Expression (9), the accuracy of the estimation can be improved.

The estimating unit 120 may estimate a plurality of the arrangements having small contradiction.

The output unit 130 outputs output information related to the position of each of the wireless communication devices estimated by the estimating unit 120. The output information includes, for example, coordinates of positional candidates estimated as each of the wireless communication devices provided, a numerical number or a symbol associated with the positional candidate, a map for indicating the positional candidate, and a sentence for describing the positional candidate. The output information may further include the contradiction of the positional candidate that has been estimated. The output information may include information related to a plurality of the positional candidates having small contradiction. The output information may include information related to positional candidates having contradiction small second or later.

The output unit 130 may output information related to the arrangement of the wireless communication devices estimated by the estimating unit 120. For example, the output information may include a correspondence relationship between at least parts of the plurality of positional candidates and the plurality of the wireless communication devices. Examples of the information related to the correspondence relationship may include a table, a drawing, and a list. The information related to the correspondence relationship may be displayed as a design drawing including the positional candidates.

The output information may further include information related to the contradiction of the arrangement. The output information may include information related to the plurality of the arrangements having small contradiction.

FIG. 6 is a table of the exemplary output information. The output information in FIG. 6 is a table relating to the arrangement of the plurality of the wireless communication devices. The table indicates a correspondence relationship between the N spots of the positional candidates $P_1$ to $P_N$ and wireless communication device ID, and contradiction Y based on Expression (9) with this arrangement.

FIG. 7 is a flow chart of a method of estimating the position of each of the wireless communication devices.

First, the position estimating apparatus 100 acquires the first information, the second information, and the third information (S301). Next, the contradiction of each of the plurality of positional candidates is calculated (S302). Then, each of the wireless communication devices is estimated to be at a positional candidate having contradiction smaller than the contradiction of each of other positional candidates. A result of the estimation may be output as the output information.

Figure 8:
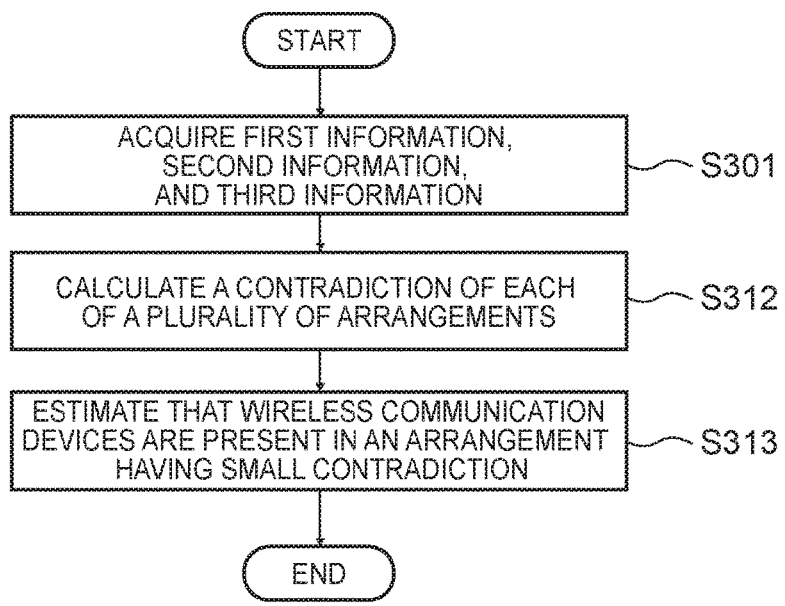
FIG. 8 is a flow chart of a method of estimating an arrangement of the wireless communication device, according to the first embodiment.

FIG. 8 is a flow chart of a method of estimating the arrangement of the wireless communication devices.

The contradiction of each of the plurality of the arrangements may be calculated instead of calculation of the contradiction of each of the plurality of positional candidates (S312). In this case, the plurality of the wireless communication devices is estimated to be in an arrangement having small contradiction (S313).

A device having such a wireless communication device, may be a power conversion device (an inverter or a power conditioning system (PCS)) to be attached to a solar panel (a solar generator, a solar battery, or photovoltaics (PV)) included in a mega solar system. In addition, the wireless communication device may be provided to a movable control device that controls drive of another device, such as a remote controller.

The position estimating apparatus according to the present embodiment can improve the accuracy of positional estimation of the solar panel. Furthermore, a mistake can be prevented or the mistake can be discovered.

Second Embodiment

The position estimating apparatus including the estimating unit 120 that estimates a position of a wireless communication device further with additional information will be described.

Figure 9:
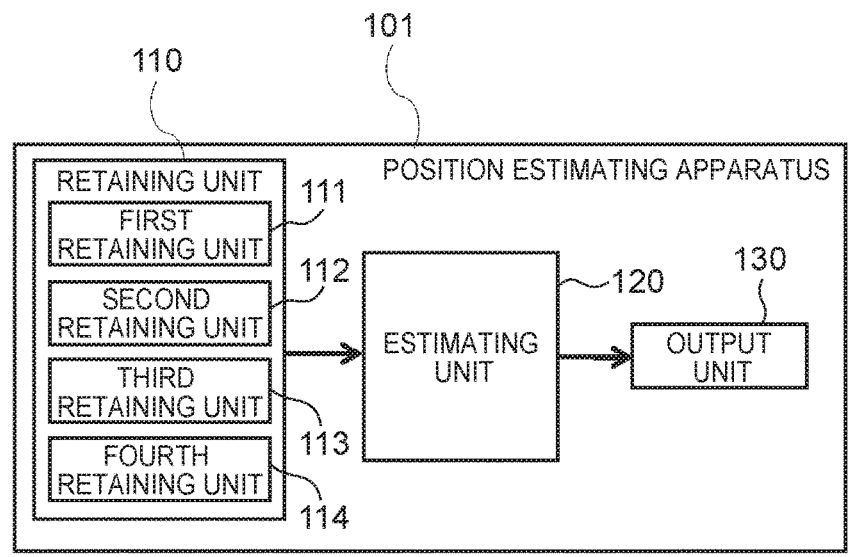
FIG. 9 is a block diagram of an exemplary configuration of an apparatus for estimating a position of a wireless communication device, according to a second embodiment.

FIG. 9 is a block diagram of an exemplary configuration of the position estimating apparatus. A retaining unit 110 of the position estimating apparatus 101 may retain complementary information. For example, a fourth retaining unit 114 included in the retaining unit 110 retains the complementary information. The complementary information is acquired by a method without transmission and reception of a radio wave between wireless communication devices. For example, the complementary information indicates, among a plurality of positional candidates, a positional candidate at which the wireless communication device having a position to be estimated is not provided. For example, when the arrangement of the plurality of the wireless communication devices is estimated, the complementary information is acquired by visually observing the wireless communication device ID of a part of the plurality of the wireless communication devices and the position thereof.

For example, when the plurality of the wireless communication devices is individually provided to a plurality of illuminating devices, by turning on or off an illuminating device with a power switch corresponding to each of the positional candidates, the complementary information related to the illuminating device and a wireless communication device, each provided to the positional candidate, can be acquired. When one breaker corresponds to the plurality of positional candidates, by turning on or off the breaker, the complementary information related to the plurality of illuminating devices and the plurality of the wireless communication devices, individually corresponding to the plurality of positional candidates, can be acquired.

The complementary information may relate to the configuration of the wireless communication devices that transmit and receive a radio wave. For example, the complementary information may include a direction of an antenna, a directivity of the antenna, presence and absence of a movable object, an angle, and a gain of an amplifier.

Figure 10:
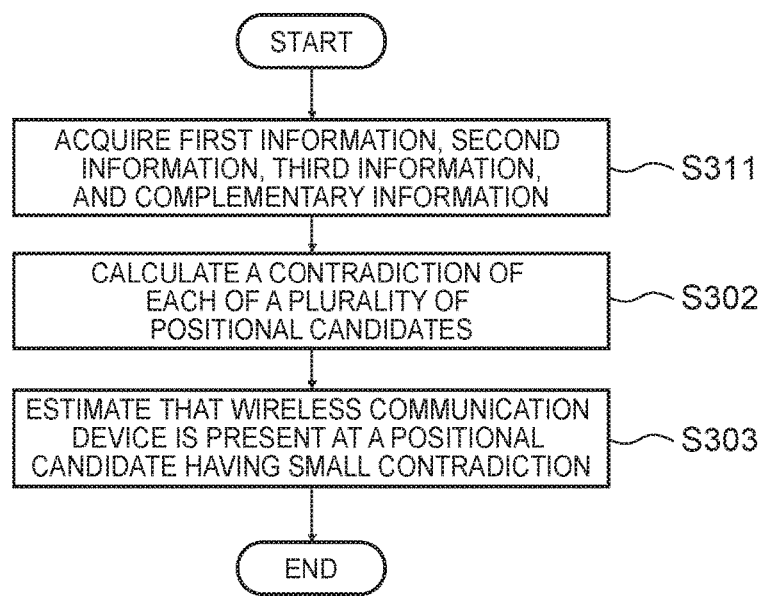
FIG. 10 is a flow chart of a method of estimating the position of a wireless communication device, according to the second embodiment.
Figure 11:
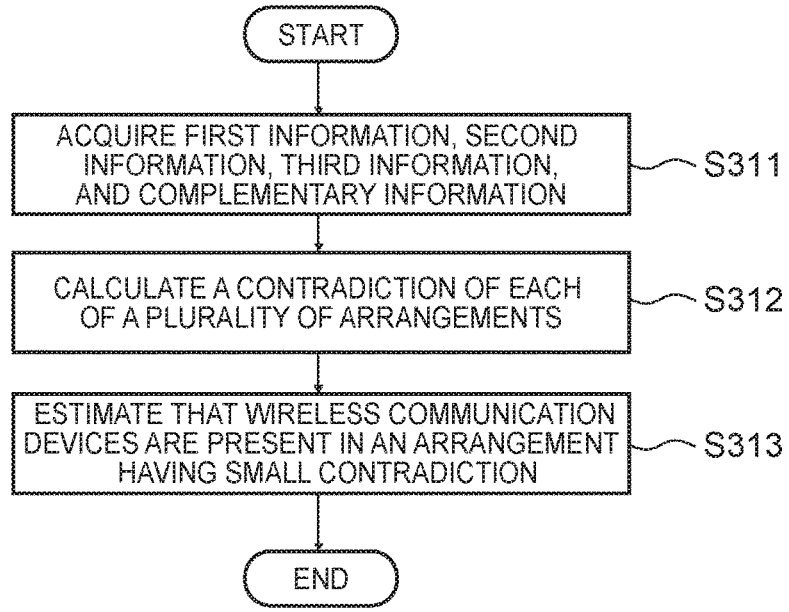
FIG. 11 is a flow chart of a method of estimating the arrangement of the wireless communication device according to the second embodiment.

FIG. 10 is a flow chart of a method of estimating the position of each of the wireless communication devices. FIG. 11 is a flow chart of a method of estimating the arrangement of the wireless communication devices. The estimating unit 120 may estimate the position of each of the wireless communication devices, based on the first information, the second information, the third information, and the complementary information (S311).

The estimating unit 120, for example, removes a positional candidate at which each of the wireless communication devices having a position to be estimated is not provided among the positional candidates included in the first information, indicated by the complementary information, from targets to be estimated. That is, for example, the contradiction of the positional candidate indicated by the complementary information is not calculated.

The estimating unit 120 estimates, for example, the arrangement of the plurality of the wireless communication devices from arrangements including each combination of the wireless communication devices and the positional candidates (acquired by the complementary information), among arrangements to be taken by the plurality of the wireless communication devices (acquired by the first information). For example, the estimating unit 120 calculates a contradiction for each of a plurality of arrangements including each combination of the wireless communication devices and positional candidates acquired by the complementary information, so as to estimate one arrangement. The arrangements to be taken are based on combinations of the plurality of wireless communication devices and the plurality of positional candidates. By a conventional method, the arrangements to be taken can be calculated.

In some cases, the position of each of the wireless communication devices is difficult to be estimated because the number of the positional candidates is large. For example, the plurality of positional candidates has similar contradiction in some cases. By limiting the number of positional candidates using the complementary information, the accuracy of positional estimation can be further improved. By limiting the arrangements to be taken by the plurality of the wireless communication devices using the complementary information, the accuracy of arrangement estimation can be further improved.

The estimating unit 120 may use the complementary information when the estimation is determined to be incorrect based on the complementary information after the estimating unit 120 performs the positional estimation based on the first information, the second information, and the third information. For example, when the complementary information indicates that a wireless communication device is not provided at a positional candidate estimated by the estimating unit 120, the estimating unit 120 may again perform the positional estimation based on the first information, the second information, the third information, and the complementary information. That is, the present embodiment may be performed after the performance of the first embodiment.

Figure 12:
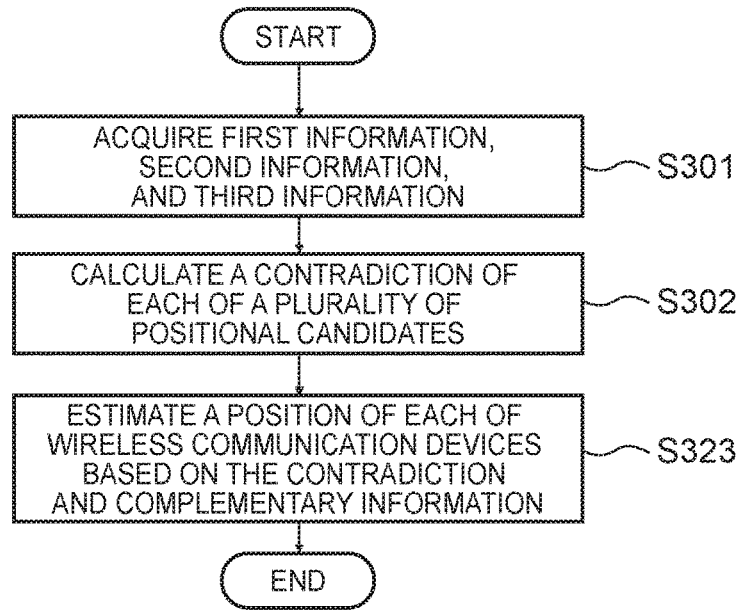
FIG. 12 is a flow chart of another method of estimating the position of the wireless communication device, according to the second embodiment.
Figure 13:
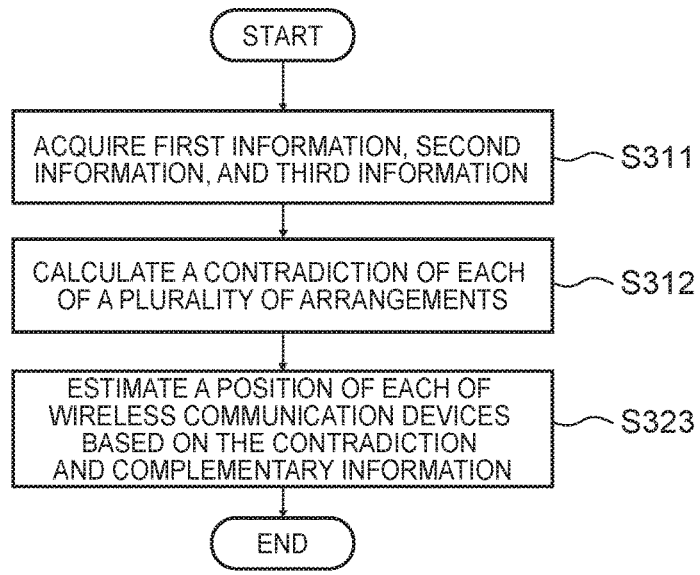
FIG. 13 is a flow chart of another method of estimating the arrangement of the wireless communication device, according to the second embodiment.

When the contradiction of each of the plurality of positional candidates is determined to be low, a wireless communication device may be estimated to be at one of the plurality of positional candidates, based on the complementary information. FIG. 12 is a flow chart of another method of estimating the position of each of the wireless communication devices. FIG. 13 is a flow chart of another method of estimating the arrangement of the wireless communication devices. The estimating unit 120 estimates the position of each of the wireless communication devices or the arrangement of the wireless communication devices, based on the contradiction and the complementary information (S323). By using the complementary information, the number of the plurality of positional candidates or the number of the plurality of the arrangements, having low contradiction, can be limited.

Third Embodiment

The position estimating apparatus including the estimating unit 120 that estimates a position of a wireless communication device further with sensor information will be described.

Figure 14:
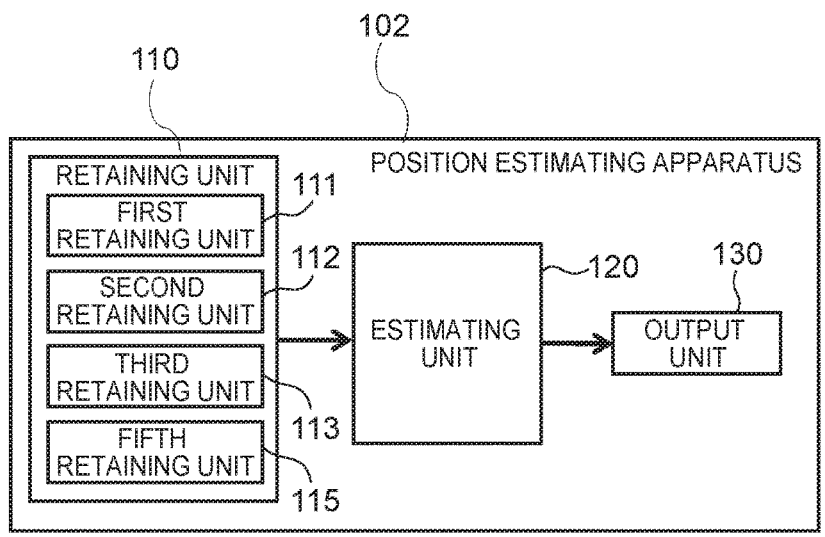
FIG. 14 is a block diagram of an exemplary configuration of an apparatus for estimating a position of a wireless communication device, according to a third embodiment.

FIG. 14 is a block diagram of an exemplary configuration of the position estimating apparatus. A retaining unit 110 of the position estimating apparatus 102 may retain the sensor information. The sensor information includes, for example, temperature information and illuminance information. For example, a fifth retaining unit 115 included in the retaining unit 110 retains the sensor information. Complementary information is acquired by a method without transmission and reception of a radio wave between wireless communication devices.

A sensor provided to each device including the wireless communication device, acquires the sensor information. Alternatively, one sensor or a plurality of the sensors provided in an indoor or outdoor certain range including the wireless communication device provided, acquires the sensor information. Examples of the sensor include a temperature sensor and an illuminance sensor.

FIG. 15A is a view of an illuminating device including a wireless communication device and a sensor. FIG. 15B is a view of an indoor equipment of an air conditioner including a wireless communication device and a sensor. For example, the wireless communication device 31 and the sensor (illuminance sensor) 32 are provided to a housing 23 of the illuminating device 21. Here, by turning on a light source 22 of the illuminating device 21, the illuminance information can be acquired from the sensor (illuminance sensor) 32. Furthermore, for example, the wireless communication device 31 and the sensor (temperature sensor) 32 are provided to the housing 23 of the indoor equipment 24 of the air conditioner. Here, when a device including the wireless communication device 31 provided is the indoor equipment 24 of the air conditioner, by operating the air conditioner, the temperature information can be acquired from the sensor (temperature sensor) 32.

A plurality of positional candidates can be limited by the sensor information. For example, on an assumption h that a wireless communication device is present at one of the plurality of positional candidates, based on a difference between the sensor information estimated to be acquired and the sensor information actually acquired, penalty Penalty(h) can be given to the assumption h. For example, the contradiction can be calculated with the penalty Penalty(h) as shown in Expression (10).

$$c(h)=\text{Penalty}(h)+|(y-x)|^m, \text{ under } h \tag{10}$$

The sensor information to be estimated may be indicated with the value difference between any two of the positional candidates. For example, the sensor information may include the temperature difference or the illuminance difference for each pair of any two of the positional candidates.

The penalty Penalty(h) is, for example, given for each pair of any two of the wireless communication devices, based on the sensor information. The penalty Penalty(h) having the same value may be given for each assumption h. For example, when the difference between the sensor information to be predicted and the sensor information actually acquired is larger than or equal to a threshold value, the penalty Penalty (h) may be given. Furthermore, the value of the penalty Penalty(h) may increase as the difference between the sensor information to be predicted and the sensor information actually acquired increases.

In order to estimate the arrangement of the plurality of the wireless communication devices, for example, the penalty Penalty (h) is used so that the contradiction can be calculated as shown in Expression (11).

$$c(h)=\text{Penalty}(h)+\Sigma W|(y-x)|^m, \text{ under } h \tag{11}$$

For example, when the illuminating device including the wireless communication device and the illuminance sensor, is arranged at each of the plurality of positional candidates inside a room, if all the illuminating devices are simultaneously turned on, it is estimated that the closer the side of a window is, the higher the illuminance is. The value of the penalty to be given to the assumption h can be determined based on the difference between the sensor information to be predicted based on the assumption h, and the sensor information actually acquired. By calculating the contradiction based on the sensor information in addition to a received signal strength indicator, the estimation accuracy can be further improved.

Figure 17:
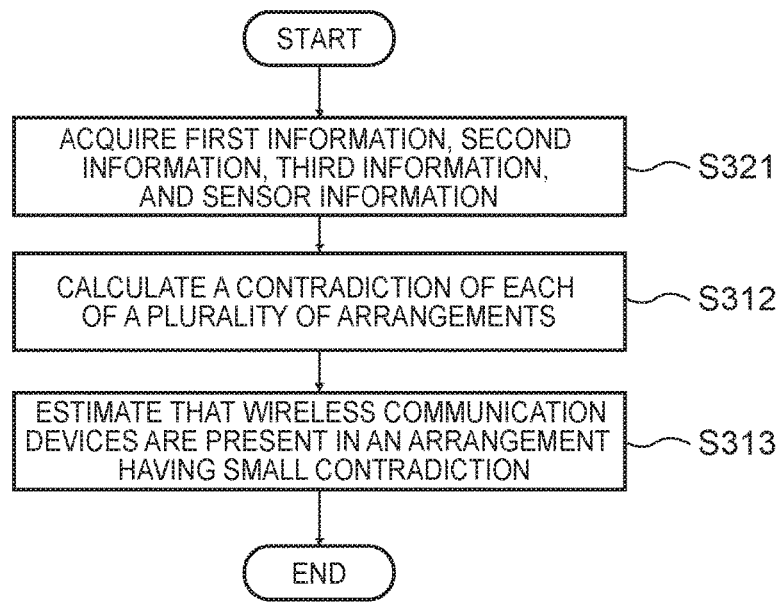
FIG. 17 is a flow chart of a method of estimating the arrangement of the wireless communication device, according to the third embodiment.

FIG. 16 is a flow chart of a method of estimating the position of each of the wireless communication devices. FIG. 17 is a flow chart of a method of estimating the arrangement of the wireless communication devices. By acquiring the first information, the second information, the third information and the sensor information, the estimating unit 120 may estimate the position of each of the wireless communication devices (S321).

Fourth Embodiment

Packet loss rate as one example of communication situation information may be used instead of the sensor information of the third embodiment. For example, third information includes the packet loss rate. Penalty Penalty (h) is given based on the packet loss rate.

By calculating the contradiction based on the packet loss rate in addition to the received signal strength indicator, the estimation accuracy can be further improved.

Fifth Embodiment

In the first to fourth embodiments, by comparing the received signal strength indicator based on the measurement with the received signal strength indicator estimated based on the distance on the assumption, the position of each of the wireless communication devices is estimated. By comparing the distance acquired from the received signal strength indicator based on the measurement with the distance on the assumption, the position of each of the wireless communication devices can be estimated.

In the first to fourth embodiments, Expression (12) instead of Expression (2) and Expression (13) instead of Expression (5) may be used.

$$x = \frac{\hat{d}_{oi}}{\hat{d}_{cons}}, \text{ under } h \quad (12)$$

$$y = 10^{\frac{r_{oi}+\hat{b}_{oj}-R_{cons}}{10\eta}}, \text{ under } h \quad (13)$$

In the first to fourth embodiments, Expression (14) instead of Expression (6) and Expression (15) instead of Expression (8) may be used.

$$x = \frac{\hat{d}_{oi}}{\hat{d}_{oj}}, \text{ under } h \quad (14)$$

$$y = 10^{\frac{r_{oi}-r_{oj}+\hat{b}_{oi}-\hat{b}_{oj}}{10\eta}}, \text{ under } h \quad (15)$$

According to the present embodiment, by correcting a received signal strength indicator based on any one of attenuation and reflection of a radio wave due to an object, the estimation accuracy can be improved.

Sixth Embodiment

In the first to fifth embodiments, when the arrangement of the plurality of the wireless communication devices is estimated, two received signal strength indicators are required in order to acquire the value of y. According to the present embodiment, by acquiring the value of y based on one received signal strength indicator and one transmitted signal strength indicator, the arrangement of a plurality of wireless communication devices is estimated. Namely, by using the received strength and the transmitted strength of each pair of the wireless communication devices that transmits and receives a radio wave, the arrangement of the plurality of wireless communication devices is estimated. In the present embodiment, for example, the arrangement of the plurality of wireless communication devices larger than or equal to 3 is estimated.

For example, Expression (16) and Expression (17) are used for x and y in Expression (9), respectively.

$$x = TxPower - 10 \times \eta \times \log_{10} \hat{d}_{oi} \quad (16)$$

$$y = r_{oi} + \hat{b}_{oi}, \text{ under } h \quad (17)$$

TxPower represents the transmitted signal strength indicator of a wireless communication device that transmits the radio wave, in each pair of the wireless communication devices.

The transmitted strength of the wireless communication device that transmits the radio wave, may be retained in a retaining unit 114 as the fourth information. For example, a fifth retaining unit 115 may retain the fourth information.

The y is a value as one of the plurality of the first received signal strength indicators, corrected with a first correction value based on the second information.

The x is a value indicating a difference between the transmitted signal strength indicator and a logarithm of a distance between the first wireless communication device and one of the plurality of the second wireless communication devices, the one corresponding to the one of the plurality of the first received signal strength indicators, in the arrangement h.

Expression (18) and Expression (19) can be used instead of Expression (16) and Expression (17).

$$x = \hat{d}_{oi}, \text{ under } h \quad (18)$$

$$y = 10^{\frac{TxPower - r_{oi} + \hat{b}_{oi}}{10\eta}}, \text{ under } h \quad (19)$$

Furthermore, Expression (16) and Expression (17) may be used in Expression (11). Expression (18) and Expression (19) may be used in Expression (11).

According to the present embodiment, by correcting a received radio wave indicator based on any one of the attenuation and the reflection of the radio wave due to the object, the estimation accuracy can be improved.

Seventh Embodiment

Figure 18:
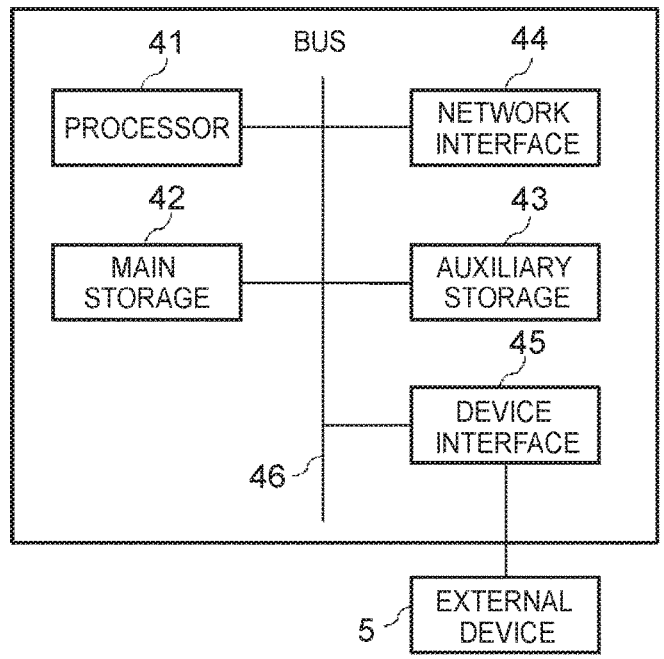
FIG. 18 is a block diagram of an exemplary hardware configuration according to a seventh embodiment.

FIG. 18 is a block diagram of an exemplary hardware configuration according to one embodiment. A position estimating apparatus 100 (101, 102) can be realized as a computer including a processor 41, a main storage 42, an auxiliary storage 43, a network interface 44 and a device interface 45, which are coupled through a bus 46.

The processor 41 reads a program from the auxiliary storage 43, expands the program into the main storage 42, and executes the program. As a result, the function of each of the retaining unit 110, the estimating unit 120 and the output unit 130, can be realized.

The position estimating apparatus according to the present embodiment, may be realized by previously installing the program to be executed thereby into the computer, or may be realized by appropriately installing the program stored in a storage medium, such as a CD-ROM, or the program through a network, into the computer.

The main storage 42 is a memory that temporarily stores a command to be executed by the processor 41 and various data. The main storage 42 may be a volatile memory such as a DRAM, or a nonvolatile memory such as an MRAM. The auxiliary storage 43 permanently stores the program or data. Examples of the auxiliary storage 43 include an HDD and an SSD.

The network interface 44 is an interface to connect with a communication network. Communication with a wireless communication device may be realized by the network interface 44. Here, only one network interface 44 is shown, but a plurality of the network interfaces may be built in.

The device interface 45 is an interface to connect with a device such as an external device 5. As examples of the external device, an input unit and the output unit 130 may be coupled to the device interface 45.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus that estimates a position of a wireless communication device, comprising:
   a memory that stores
      first information related to a positional relationship among a plurality of positional candidates, second information related to an influence on the plurality of positional candidates due to at least any of an attenuation and a reflection of a radio wave by an object located at a periphery of the plurality of positional candidates, and third information including a first received signal strength indicator of the radio wave that is transmitted from a first wireless communication device and that is received by a second wireless communication device; and a processor configured to estimate a position of the second wireless communication device from the plurality of positional candidates, based on a first value as the first received signal strength indicator corrected with a first correction value based on the second information, and a plurality of first distances between the first wireless communication device and each of the plurality of positional candidates; and output information related to the position of the second wireless communication device via an external device.

2. The apparatus according to claim 1, wherein
the third information further includes a second received signal strength indicator of the radio wave that is transmitted from the first wireless communication device and that is received by a third wireless communication device, and the processor is configured to estimate each position of the second wireless communication device and the third wireless communication device from the plurality of positional candidates, based on a first ratio between the first value and a second value as the second received signal strength indicator corrected with a second correction value based on the second information, and a value based on a second ratio between one distance and another distance included in the plurality of first distances.

3. The apparatus according to claim 2, wherein
the processor is configured to estimate, among combinations of any two positional candidates selected from the plurality of positional candidates, a combination having a smaller difference between the first ratio and the value based on the second ratio than the respective differences of other combinations, as the each position of the second wireless communication device and the third wireless communication device.

4. The apparatus according to claim 2, wherein
the second correction value is a value indicating an influence due to the object located at the periphery, on the radio wave transmitted and received between any two positional candidates included in the plurality of positional candidates.

5. The apparatus according to claim 1, wherein
the third information includes a plurality of the first received signal strength indicators of the radio wave received by a plurality of the second wireless communication devices, the radio wave being transmitted from the first wireless communication device, and the processor is configured to estimate, among a plurality of arrangements to be taken by the plurality of the second wireless communication devices in the plurality of positional candidates, an arrangement h having a smaller value c(h) expressed by Expression (1) than the respective values c(h) of other arrangements, as the arrangement of the plurality of the second wireless communication devices, $$c(h) = \Sigma W |(y-x)|^m, \text{ under } h \qquad (1)$$

where y represents a third ratio between two values of the first values as the first received signal strength indicators of any two second wireless communication devices included in the plurality of the second wireless communication devices, corrected with the first correction value, x represents a value based on a fourth ratio between one distance between the first wireless communication device and one of the any two second wireless communication devices and the other distance between the first wireless communication device and the other of the any two second wireless communication devices, in the arrangement h, W represents a weighting value given for each combination of the any two second wireless communication devices, and m represents a positive value larger than or equal to 1.

6. The apparatus according to claim 1, wherein
the memory further stores fourth information related to a transmitted signal strength indicator of the first wireless communication device, the third information includes a plurality of the first received signal strength indicators of the radio wave received by a plurality of the second wireless communication devices, the radio wave being transmitted from the first wireless communication device, and the processor is configured to estimate, among a plurality of arrangements to be taken by the first wireless communication device and the plurality of the second wireless communication devices in the plurality of positional candidates, an arrangement h having a smaller value c(h) expressed by Expression (2) than the respective values c(h) of other arrangements, as the arrangement of the plurality of the second wireless communication devices, $$c(h) = \Sigma W |(y-x)|^m, \text{ under } h \qquad (2)$$

where y represents a value as one of the plurality of the first received signal strength indicators, corrected with the first correction value, x represents a difference between a logarithm of a distance between the first wireless communication device and one of the plurality of the second wireless communication devices corresponding to the one of the plurality of the first received signal strength indicators, and the transmitted signal strength indicator, in the arrangement h, W represents a weighting value given for each combination of any two second wireless communication devices included in the plurality of the second wireless communication devices, and m represents a positive value larger than or equal to 1.

7. The apparatus according to claim 1, wherein
the first correction value is a value indicating an influence due to the object located at the periphery, on the radio wave transmitted and received between any two positional candidates included in the plurality of positional candidates.

8. The apparatus according to claim 1, wherein
the second information includes information related to a plurality of the correction values each corresponding to combinations of any two positional candidates included in the plurality of positional candidates.

9. The apparatus according to claim 1, wherein
the memory further stores a sensor information related to a temperature or an illuminance at the periphery of the first wireless communication device,
the third information includes a plurality of the first received signal strength indicator of the radio wave received by a plurality of the second wireless communication devices, the radio wave being transmitted from the first wireless communication device, and
the processor is configured to estimate an arrangement h having the smallest value c(h) expressed by Expression (3), among the respective values c(h) of a plurality of arrangements to be taken by the first wireless communication device and the plurality of the second wireless communication devices in the plurality of positional candidates, as the arrangement of the first wireless communication device and the plurality of the second wireless communication devices, $$c(h) = \text{Penalty}(h) + \Sigma W|(y-x)|^m, \text{ under } h \quad (3)$$

where y represents a third ratio between two of the first values as two values of the first received signal strength indicators received by two second wireless communication devices included in the plurality of the second wireless communication devices, corrected with the first correction value,
x represents a value based on a fourth ratio between two distances between one positional candidate corresponding to the first wireless communication device and each of two positional candidates corresponding to the two second wireless communication devices, in one of the plurality of arrangements,
Penalty(h) represents a value given for each of the plurality of arrangements,
W represents a weighting value given for each combination of any two second wireless communication devices included in the plurality of second wireless communication devices, and
m represents a positive value larger than or equal to 1.

10. A method that estimates a position of a wireless communication device, comprising:
storing
first information related to a positional relationship among a plurality of positional candidates,
second information related to an influence on the plurality of positional candidates due to at least any of an attenuation and a reflection of a radio wave by an object located at a periphery of the plurality of positional candidates, and
third information including a first received signal strength indicator of the radio wave that is transmitted from a first wireless communication device and that is received by a second wireless communication device; and
estimating a position of the second wireless communication device from the plurality of positional candidates, based on
a first value as the first received signal strength indicator corrected with a first correction value based on the second information, and
a plurality of first distances between the first wireless communication device and each of the plurality of positional candidates; and outputting information related to the position of the second wireless communication device via an external device.

11. The method according to claim 10, wherein
the third information further includes
a second received signal strength indicator of the radio wave that is transmitted from the first wireless communication device and that is received by a third wireless communication device, and
the estimating further includes
estimating each position of the second wireless communication device and the third wireless communication device from the plurality of positional candidates, based on
a first ratio between the first value and a second value as the second received signal strength indicator corrected with a second correction value based on the second information, and
a value based on a second ratio between one distance and another distance included in the plurality of first distances.

12. The method according to claim 11, wherein
the estimating further includes
estimating, among combinations of any two positional candidates selected from the plurality of positional candidates, a combination having a smaller difference between the first ratio and the value based on the second ratio than the respective differences of other combinations, as the each position of the second wireless communication device and the third wireless communication device.

13. The method according to claim 11, wherein
the second correction value is a value indicating an influence due to the object located at the periphery, on the radio wave transmitted and received between any two positional candidates included in the plurality of positional candidates.

14. The method according to claim 10, wherein
the third information further includes
a plurality of the first received signal strength indicators of the radio wave received by a plurality of the second wireless communication devices, the radio wave being transmitted from the first wireless communication device, and
the estimating further includes
estimating, among a plurality of arrangements to be taken by the plurality of the second wireless communication devices in the plurality of positional candidates, an arrangement h having a smaller value c(h) expressed by Expression (1) than the respective values c(h) of other arrangements, as the arrangement of the plurality of the second wireless communication devices, $$c(h) = \Sigma W|(y-x)|^m, \text{ under } h \quad (1)$$

where y represents a third ratio between two values of the first values as the first received signal strength indicators of any two second wireless communication devices included in the plurality of the second wireless communication devices, corrected with the first correction value,
x represents a value based on a fourth ratio between one distance between the first wireless communication device and one of the any two second wireless communication devices and the other distance between the first wireless communication device and the other of the any two second wireless communication devices, in the arrangement h, W represents a weighting value given for each combination of the any two second wireless communication devices, and m represents a positive value larger than or equal to 1.

15. The method according to claim 10, wherein the storing further includes storing fourth information related to a transmitted signal strength indicator of the first wireless communication device, the third information further includes a plurality of the first received signal strength indicators of the radio wave received by a plurality of the second wireless communication devices, the radio wave being transmitted from the first wireless communication device, and the estimating further includes estimating, among a plurality of arrangements to be taken by the first wireless communication device and the plurality of the second wireless communication devices in the plurality of positional candidates, an arrangement h having a smaller value c(h) expressed by Expression (2) than the respective values c(h) of other arrangements, as the arrangement of the plurality of the second wireless communication devices, $$c(h) = \Sigma W |(y-x)|^m, \text{ under } h \qquad (2)$$

where y represents a value as one of the plurality of the first received signal strength indicators, corrected with the first correction value, x represents a difference between a logarithm of a distance between the first wireless communication device and one of the plurality of the second wireless communication devices corresponding to the one of the plurality of the first received signal strength indicators, and the transmitted signal strength indicator, in the arrangement h, W represents a weighting value given for each combination of any two second wireless communication devices included in the plurality of the second wireless communication devices, and m represents a positive value larger than or equal to 1.

16. The method according to claim 10, wherein the first correction value is a value indicating an influence due to the object located at the periphery, on the radio wave transmitted and received between any two positional candidates included in the plurality of positional candidates.

17. The method according to claim 10, wherein the second information further includes information related to a plurality of the correction values each corresponding to combinations of any two positional candidates included in the plurality of positional candidates.

18. A wireless communication system comprising:

an apparatus that estimates a position of a wireless communication device comprising, a memory that stores first information related to a positional relationship among a plurality of positional candidates, second information related to an influence on the plurality of positional candidates due to at least any of an attenuation and a reflection of a radio wave by an object located at a periphery of the plurality of positional candidates, and third information including a first received signal strength indicator of the radio wave that is transmitted from a first wireless communication device and that is received by a second wireless communication device; and a processor configured to estimate a position of the second wireless communication device from the plurality of positional candidates, based on a first value as the first received signal strength indicator corrected with a first correction value based on the second information, and a plurality of first distances between the first wireless communication device and each of the plurality of positional candidates; and output information related to the position of the second wireless communication device via an external device;

the first wireless communication device; and the second wireless communication device.

* * * * *